Nov. 24, 1970  E. D. GEORGE  3,541,860

PRESSURE VESSEL SAMPLING DEVICE

Filed March 18, 1969

INVENTOR.
EVERETT D. GEORGE
BY

AGENT

United States Patent Office 3,541,860
Patented Nov. 24, 1970

3,541,860
PRESSURE VESSEL SAMPLING DEVICE
Everett D. George, Cuyahoga Falls, Ohio, assignor to The Goodyear Tire & Rubber Company, Akron, Ohio, a corporation of Ohio
Filed Mar. 18, 1969, Ser. No. 808,125
Int. Cl. G01n 1/20
U.S. Cl. 73—421                               5 Claims

ABSTRACT OF THE DISCLOSURE

A body having a sample receiving chamber is connected to a vessel containing a flowable material under a pressure or a vacuum. A deformable plug connected to a stem is axially movable within the body in a first or a second direction. A sample of the material is obtained by moving the stem and plug in the first direction to open the chamber to the vessel and then moving the stem and plug in the second direction to move the sample into the chamber. The movement in the second direction is continued until the deformable plug has expanded to seal the sample chamber within the body.

---

The abstract is not to be taken as limiting the invention of this application, and in order to understand the full nature and extent of the technical disclosure of this application, reference must be made to the accompanying drawings and the following detailed description.

This invention relates to an improved device for extracting a specimen of material from a vessel in which a material is subjected to treatment including a pressure either above or below atmospheric pressure. More particularly, the invention relates to a novel device adapted for mounting through an opening in the wall of such a treatment vessel and useful for abstracting from the vessel a representative sample of the material undergoing treatment therewithn without effect on the pressure within the vessel.

A principal object of the invention is to provide a simple, effective, and low cost sampling device for use with treatment vessels wherein a material is subjected to a treatment including the use of pressure either above or below normal atmospheric pressure.

A further object is to provide a novel device whereby representative samples of flowable material undergoing pressure or vacuum treatment can be withdrawn from a vessel without affecting the pressure therewithin to any significant degree.

Figure 1:
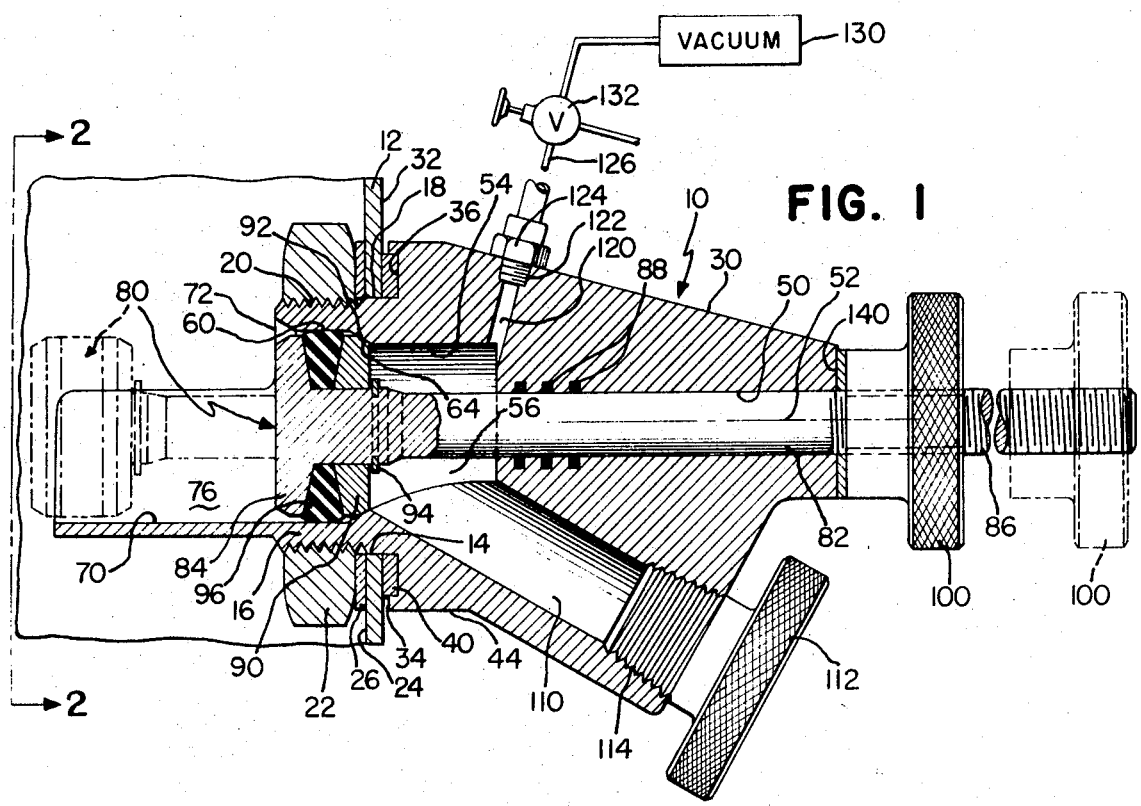
Figure 2:
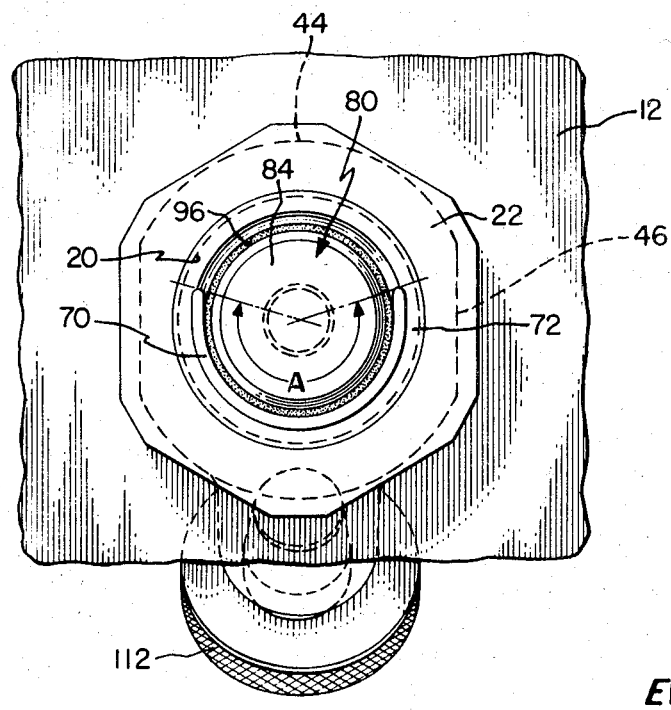

Other objects and advantages of the invention will become apparent or be particularly pointed out in the following description of a specific illustrative embodiment of the invention and the accompanying drawings thereof wherein:

FIG. 1 is a longitudinal cross-section of a sampling device according to the invention; and FIG. 2 is an end view of the device of FIG. 1 as indicated by the line 2—2.

As may be seen in FIGS. 1 and 2, a sampling device 10 according to the invention is adapted to be mounted on a reactor or vessel, a wall portion 12 of which is provided with an opening 14 admitting thereinto a first portion 16 of the body of the device 10. The first portion 16 of the body includes a cylindrical surface 18 received within the opening 14 and a threaded surface 20 which cooperates with a suitably threaded nut or collar 22 to compress tightly between the nut and inner surface 24 of the wall a sealing ring or washer 26.

The second or outer portion 30 of the body is provided with means for engaging the outer surface 32 of the vessel wall 12 and to seal the opening 14 therein in the form of a flange 34 having an annular groove 36 in which is retained a compressible seal ring 40 of material conformable with the respective faces of the vessel wall and the groove. A peripheral surface 44 of the outer portion is provided with wrench flats 46 or otherwise polygonal form in a conventional manner to assist in making up a tight joint between the body of the sampling device and the vessel wall 12 as the collar 22 is screwed onto the body.

The device is provided with a bore 50, the axis 52 of which extends longitudinally of the device and generally, although not necessarily, normal to the plane of the flange 34. A counterbore 54 coaxial with the bore 50 and open axially toward the first portion 16 of the device provides a chamber 56 into which a specimen of material may be received from the vessel.

A second counterbore 60, slightly larger in diameter than the first counterbore 54, and coaxial with the bore 50 terminates in a coaxial conical shoulder 64 disposed between the first counterbore and the second counterbore. The radial dimension of the shoulder 64 and the angle of its conical surface with respect to the axis 52 are small, the latter being about 30 degrees, in order that the material of the specimen can move past the shoulder 64 from the second counterbore 60 to the first counterbore 54 with minimum interference and with little or no tendency to accumulate on the shoulder.

The first body portion 16 includes a parti-cylindrical trough 70 extending coaxially outward from the outward end 72 of the cylindrical wall of the second counterbore and providing a coaxial surface having its cylinder radius substantially equal to the radius of the second counterbore. The angle A subtended by the trough 70 about the axis 52 is approximately 200 degrees. The body of the device is positioned normally so that the trough is open upwardly. In any event the trough is suitably oriented to receive and temporarily retain an acceptable quantity of the material within the vessel. Cooperating with plug means, subsequently described herein, the trough provides a pocket or receptacle 76 for the temporary retention of a sepcimen to be accommodated in the chamber. The axial length and arcuate width of the trough and the axial space between the end 72 and the first or outward position of the plug means are determined, either analytically or by simple experiment, to suit flow properties of the material to be sampled so that the quantity of material entering the pocket 76 formed by the plug and the trough is not in excess of the quantity which can be received in the chamber 56.

In accordance with the invention, plug means movable between a first position axially outwardly along the trough, as may be seen in phantom outline in FIG. 1, and a second position within the second counterbore 60 comprises a plug 80 having a stem 82 slidably received in the bore 50 and extending axially outwardly thereof between circular head 84 forming part ofthe plug 80 and an end portion 86 extended outwardly of the body portion 30 and of the vessel wall. The stem 82 is closely fitted in the bore 50 and provided with seals in the form of a plurality of O-rings 88 to prevent loss of pressure differential between the vessel and the surrounding atmosphere. The plug 80 includes a rigid annular disc 90 with an annular conical seat 92 mounted coaxially of the stem 82 and movable therealong relative to the head 84 and retained thereon by a snap or retainer ring 94 seated within an annular groove in the stem 82. Disposed about the stem between the head and the disc is an annular elastic deformable member 96 of a suitable rubber or the like the periphery of which is engageable, upon radial expansion of the member, in positive sealing relation with the cylindrical wall of the second counterbore 60. It will now be observed that the plug 80 and stem 82 can be rotated about the axis 52. Rotation of the plug within the device from time to time is useful to dislodge material from the plug and the internal surfaces of the device in contact with the plug.

Disposed axially outwardly with respect to the second portion 30 of the body, means cooperable with the stem are provided in the specific embodiment by a knurled nut 100 having suitable screw threads therethrough engaged with corresponding screw threads on the outer end portion 86 of the stem. As will be apparent, alternative devices for providing movement of the plug means including the stem may be provided. For example, a conventional valve operating motor may be readily adapted to provide the desired movement.

The means for selectively closing the chamber 56 and giving access thereto are provided in the second portion 30 of the body by the passage 110 connected to the chamber and the cap 112 threadedly received in a threaded or tapped counterbore 114 in the outer end of the passage 110.

Means communicating with a source of pressure substantially equal to the pressure within the vessel are provided in the instant embodiment by a port 120 extending between the chamber 56 and the exterior of the portion 30 of the body. The outer end 122 of the port receives the terminal 124 of a conduit 126 connected with the source, e.g., the vacuum pump 130. The conduit is preferably provided with a suitable three-way valve 132 located closely adjacent the terminal 124.

Withdrawing a specimen from the material within the vessel is accomplished with the device 10 according to the invention with the elements thereof disposed as represented in FIG. 1. The specimen receiving chamber 56 is closed, the cap 112 being tightly inserted in the end of the passage 110 and the chamber 56 brought to a pressure substantially equal to the pressure contained within the vessel as by suitable operation of the valve 132. Alternatively, the volume of the chamber 56 and the associated passage and the port being very small in comparison with the volume of the vessel, the step of equalizing pressures may be omitted, it being apparent that the relative volumes of the chamber 56 and of the vessel may be such that when opened to communication therebetween there will be no significant effect on the pressure within the vessel. On the other hand, where there are in the vessel high pressures, or very low pressures of the order of a few millibars, it is preferable that the pressure in the chamber be brought to a level very nearly equal that of the pressure level within the vessel.

The nut 100 is now loosened and rotated or screwed outwardly to a position shown in phantom in FIG. 1 at the outer extremity of the end portion 86 of the stem and the stem 82 is then moved axially inwardly of the body, movement of the nut 100 being arrested by the end face 140 of the body, thereby moving the plug 80 axially along the trough 70, displacing material in the vessel by its advance and permitting a sample or specimen of the material to be received within the pocket 76 provided by the cooperation of the parti-cylindrical trough 70 between the disc 90 and the body portion 16.

The stem 82 and the plug 80 are then drawn axially outwardly of the vessel, moving a representative sample or specimen of the material from the vessel into the chamber 56 defined by the first counterbore, and bringing the conical seat 92 of the disc into engagement again with the shoulder 64 between the first and second counterbores. The nut 100 is then again rotated about the stem again bringing the nut against the end face 140 of the body. Further tightening of the nut 100 on the threads of stem portion 86 then causes relative movement between the head 84 of the plug and the disc 90 to compress the annular rubber member 96 therebetween so as to deform the member and expand the same radially into firm sealing contact with the cylindrical wall of the counterbore 60.

With the plug firmly seated and sealed as described, the chamber 56 is completely isolated from the vessel and the pressure within the chamber is now equalized by opening the valve 132 to the surrounding atmosphere.

The cap 112 is removed and the specimen may then be discharged, into a suitable receptacle, whereupon the cap 112 is replaced in the counterbore 114 and the device 10 is ready for a next sampling operation.

It will now be apparent that the device described can be disposed at any location in the wall of a vessel from which it is desirable to withdraw a sample and that any orientation of the axis of the device which allows material to enter the trough can be used. Moreover, the first portion of the device, the stem length being also modified to suit, can be lengthened to position the trough and plug so as to extract a sample from any predetermined distance inwardly of the wall of the vessel.

Furthermore, the pressure within the sample chamber 56 may be maintained at a pressure at or nearly at the pressure existing within the vessel either by interconnecting the port 120 with a suitable part of the vessel or by a separate and independent source of pressure or vacuum.

While certain representative embodiments and details have been shown for the purpose of illustrating the invention, it will be apparent to those skilled in the art that various changes and modifications may be made therein without departing from the spirit or scope of the invention.

What is claimed is:

1. A device for obtaining a sample of material from within a closed vessel comprising a body adapted to be disposed in an opening in a wall of said vessel with a first portion of said body inwardly and a second portion thereof outwardly of said wall, said body including means defining a chamber for receiving said sample, means movable axially of said body in a first direction to open said chamber to said vessel and in a second direction to move said sample into said chamber comprising plug means having an axis and including a coaxial stem having a head, a disc mounted coaxially on and relatively movable with respect to said stem, and radially deformable means disposed coaxially between said head and said disc, said means movable axially of said body being effective in its movement in said second direction to expand said radially deformable means to close said chamber with the sample therein from said vessel, said body including a bore receiving said stem and a counterbore having a coaxial conical shoulder engageable with said disc, and means cooperable with said stem to move said disc into seating engagement with said shoulder and said head toward said disc while the same is in engagement with said shoulder to cause said deformable means to expand radially into circumferential sealing engagement with said counterbore.

2. A device as claimed in claim 1, said plug means being rotatable about its own axis.

3. A device as claimed in claim 1 said first body portion having an open trough extending axially outwardly thereof, said means movable axially of said body including plug means cooperable with said trough to provide a sample selecting pocket effective to limit the quantity of said sample to be moved into said chamber.

4. A device as claimed in claim 3, wherein said pocket is disposed at a predetermined distance inwardly of the wall of said vessel.

5. A device for extracting a specimen of material from a pressure or vacuum containing vessel having an opening in a wall thereof comprising a body having a first portion adapted to be received in said opening and a second portion having means for engaging said wall and sealing said opening, said body having a cylindrical bore axially thereof, a first counterbore coaxial with said bore defining a specimen receiving chamber, and a second coaxially disposed counterbore terminating in a coaxial shoulder disposed between said first and second counterbores; said first body portion including a parti-cylindrical trough fixed coaxially of said first portion to extend into said vessel; means comprising a plug having a head portion movable between a first position axially outwardly along said trough and a second position within said second counterbore, and a stem fixed coaxially of said plug and extending slidably through said bore and having an outer end portion disposed outwardly of said body, said plug including an annular disc mounted for limited relative movement coaxially of said stem with respect to said head portion and having a seat engageable with said shoulder, and an annular elastically deformable member disposed coaxially on said stem between said head portion and said disc; and means cooperable with said stem to effect relative movement between said plug means and said body and between said head portion and said disc to deform said member into sealing relation with the cylindrical wall of said second counterbore including a nut having suitable screw threads engaged with corresponding screw threads on the end portion of the stem; and means for selectively closing said chamber and giving access to said chamber from outside said vessel.

References Cited

UNITED STATES PATENTS

| | | | |
|---|---|---|---|
| 2,482,687 | 9/1949 | Mueller et al. | 138—89 |
| 2,514,911 | 7/1950 | Tatum | 138—89 |
| 2,516,097 | 7/1950 | Woodham et al. | |
| 3,115,782 | 12/1963 | Echtler. | |
| 3,129,590 | 4/1964 | Ellis | 73—424 |
| 3,162,049 | 12/1964 | Blanchard. | |
| 3,198,016 | 8/1965 | Poorman. | |
| 3,200,649 | 8/1965 | Peterson. | |
| 3,206,981 | 9/1965 | Jameson. | |
| 3,348,419 | 10/1967 | Addison | 73—424 |

LOUIS R. PRINCE, Primary Examiner

H. C. POST III, Assistant Examiner

U.S. Cl. X.R.

138—89